(12) United States Patent
Tokgoz et al.

(10) Patent No.: US 11,616,582 B2
(45) Date of Patent: Mar. 28, 2023

(54) NEURAL NETWORK-BASED SPATIAL INTER-CELL INTERFERENCE LEARNING

(71) Applicant: QUALCOMM Incorporated, San Diego, CA (US)

(72) Inventors: Yeliz Tokgoz, San Diego, CA (US); Jay Kumar Sundararajan, San Diego, CA (US); Naga Bhushan, San Diego, CA (US); Taesang Yoo, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 17/190,227

(22) Filed: Mar. 2, 2021

(65) Prior Publication Data
US 2022/0286215 A1    Sep. 8, 2022

(51) Int. Cl.
| | |
|---|---|
| H04B 17/345 | (2015.01) |
| H04B 17/327 | (2015.01) |
| H04B 17/336 | (2015.01) |
| H04B 17/373 | (2015.01) |
| H04B 17/391 | (2015.01) |
| H04L 5/00 | (2006.01) |
| H04W 4/021 | (2018.01) |

(52) U.S. Cl.
CPC ......... *H04B 17/345* (2015.01); *H04B 17/327* (2015.01); *H04B 17/336* (2015.01); *H04B 17/373* (2015.01); *H04B 17/3913* (2015.01); *H04L 5/0023* (2013.01); *H04W 4/021* (2013.01)

(58) Field of Classification Search
CPC .. H04B 17/345; H04B 17/327; H04B 17/336; H04B 17/373; H04B 17/3913; H04L 5/0023; H04W 4/021
See application file for complete search history.

(56) References Cited

U.S. PATENT DOCUMENTS

2021/0083730 A1    3/2021  Hwang et al.

FOREIGN PATENT DOCUMENTS

| | | |
|---|---|---|
| EP | 3723306 A1 | 10/2020 |
| WO | 2019245199 A1 | 12/2019 |
| WO | 2020068127 A1 | 4/2020 |

OTHER PUBLICATIONS

International Search Report and Written Opinion—PCT/US2022/015145—ISA/EPO—dated May 9, 2022.

*Primary Examiner* — Natasha W Cosme
(74) *Attorney, Agent, or Firm* — Seyfarth Shaw LLP

(57) ABSTRACT

A method of wireless communication by a network device includes receiving a location of a user equipment (UE). The method also includes receiving information associated with neighbor cell transmit beams. The method further includes predicting a spatial inter-cell interference-based distribution at the location of the UE based on the information associated with the neighbor cell transmit beams.

30 Claims, 11 Drawing Sheets

NEURAL NETWORK-BASED SPATIAL INTER-CELL INTERFERENCE LEARNING

FIELD OF THE DISCLOSURE

Aspects of the present disclosure generally relate to wireless communications, and more particularly to techniques and apparatuses for an enhancement to neural network-based spatial inter-cell interference learning.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

A method of wireless communication by a network device includes receiving a location of a user equipment (UE). The method also includes receiving information associated with neighbor cell transmit beams. The method further includes predicting a spatial inter-cell interference-based distribution at the location of the UE based on the information associated with the neighbor cell transmit beams.

An apparatus for wireless communication by a network device is described. The apparatus includes means for receiving a location of a user equipment (UE). The apparatus also includes means for receiving information associated with neighbor cell transmit beams. The apparatus further includes means for predicting a spatial inter-cell interference-based distribution at the location of the UE based on the information associated with the neighbor cell transmit beams.

A network device includes a processor and a memory coupled with the processor. The network device also includes instructions stored in the memory. When the instructions are executed by the processor the network device is operable to receive a location of a user equipment (UE). The network device is also operable to receive information associated with neighbor cell transmit beams. The network device is further operable to predict a spatial inter-cell interference-based distribution at the location of the UE based on the information associated with the neighbor cell transmit beams.

A non-transitory computer-readable medium having program code recorded thereon is executed by a processor. The non-transitory computer-readable medium includes program code to receive a location of a user equipment (UE). The non-transitory computer-readable medium also includes program code to receive information associated with neighbor cell transmit beams. The non-transitory computer-readable medium further includes program code to predict, by a network device, a spatial inter-cell interference-based distribution at the location of the UE based on the information associated with the neighbor cell transmit beams.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
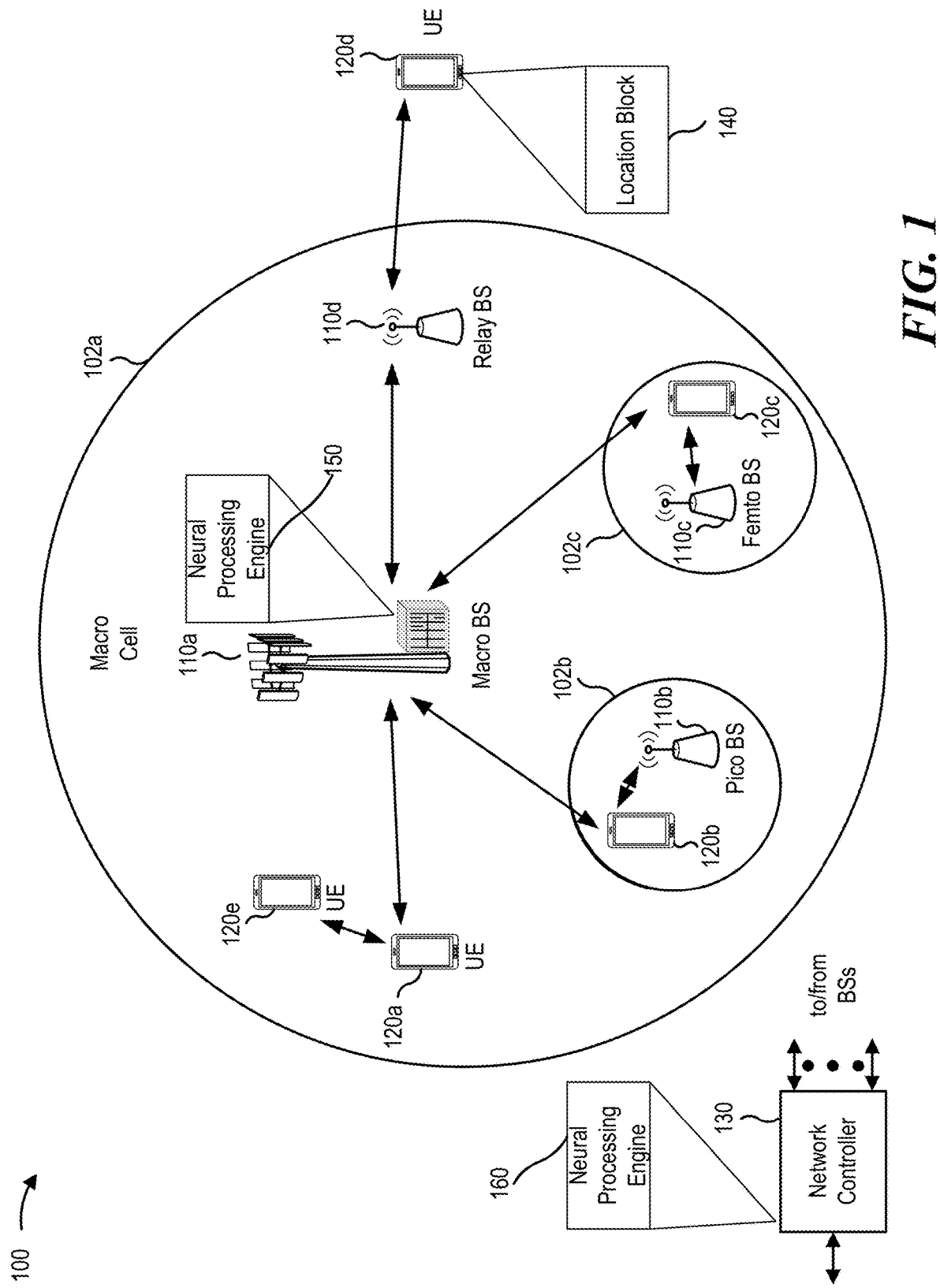
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Inter-cell interference may result in a significant signal to interference plus noise ratio (SINR) degradation for users. In particular, SINR degradation interference does not degrade the desired signal but, rather, impacts the denominator in the SINR computation. The SINR degradation for users may be especially significant when a user is at a cell edge. In addition, due to introduction of massive multiple-input multiple-output (MIMO) antennas in next generation node Bs (gNBs), this inter-cell interference may lead to a further SINR degradation for users. For example, narrow downlink transmit beams may be highly directional and highly variant with time, resulting in the SINR degradation. In particular, highly directional interference at the cell edge may reduce the data rate and negatively impact a user experience. Furthermore, high variance in the interference makes it more difficult to perform link adaptation, such as predicting a supportable modulation and coding scheme (MCS). This may be challenging for latency sensitive applications, which have a limited delay budget.

According to aspects of the present disclosure, a neural network is trained to infer the impact of any potential transmit beams of a neighbor base station (e.g., gNB) on any potential victim UE. Once the neural network is trained to infer the impact of a transmit beam of a neighbor base station on a victim UE, a network device (e.g., gNB or centralized node) predicts interference and then may coordinate with the neighbor base station to reduce the interference. In these aspects of the present disclosure, network device coordination may prohibit communication of a downlink transmit beam by the neighbor base station with the resource set used to serve the victim UE. For example, a first user equipment (UE1) experiences significant interference from a downlink transmit beam k of a neighbor base station (gNB2). In this example, spatial inter-cell interference is mitigated when the neighbor base station gNB2 avoids transmitting energy in the direction of the downlink transmit beam k over the resources used to serve the first user equipment.

In aspects of the present disclosure, a neural network is trained over time using UE channel state information (CSI) reference signal (CSI-RS) measurement reports, neighbor cell beam information, as well as UE location information. In these aspects of the present disclosure, training of the neural network may be performed at various nodes. For example, training of the neural network may be performed at a serving cell. In this example, interference measurement reports are sent to the serving cell by the UE to be used with UE location estimates and beam information to enable training.

In some aspects of the present disclosure, training of the neural network is performed at the neighbor cell(s). In these aspects of the present disclosure, the serving cell sends a UE location and interference measurement reports to the neighbor cell to enable training of the neural network at the neighbor cell. In some aspects of the present disclosure, training of the neural network is performed at a central node. In these aspects of the present disclosure, the serving cell sends the UE location, a serving cell identification (ID), a neighbor cell ID, and interference measurement reports to the centralized node to perform training of the neural network at the centralized node.

According to aspects of the present disclosure, neural network (NN) inference of an expected interference-based distribution at a given UE location may be performed at various nodes. For example, the neural network inference may be performed at a serving cell. In this example, the neural network of the serving cell predicts the expected interference-based distribution at a given UE location due to a certain set of neighbor cell transmit beams. In another example, the neural network inference may be performed at a neighbor cell. In this example, the neural network is either trained at the neighbor cell or neural network weights are shared with the neighbor cell. In this example, the neural network of the neighbor cell predicts an expected interference-based distribution at a given UE location due to a certain set of downlink transmit beams. In some aspects of the present disclosure, the neural network inference is performed at a centralized node. In these aspects of the present disclosure, the neural network is either trained at the centralized node or the neural network weights are shared with the centralized node. In this example, the neural network at the centralized node predicts an expected interference-based distribution at a given UE location due to a certain set of downlink transmit beams.

According to aspects of the present disclosure, the neural network may predict the expected interference-based distribution at a given UE location due to a certain set of aggressor transmit beams. Based on the prediction, the network device may identify undesired neighbor cell downlink beams based on certain criteria. In addition, this spatial interference characterization may be used to coordinate scheduling between nearby cells such that high interference events may be prevented.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

The UEs 120 may include a location block 140. For brevity, only one UE 120d is shown as including the interference measurement block 140. The location block 140 may provide a location of the UE 120 to a base station 110.

The base station 110 may include a neural processing engine 150. For brevity, only one base station 110a is shown as including the neural processing engine 150, but a neighbor base station may also include the neural processing engine 150. The neural processing engine 150 may predict a spatial inter-cell interference-based distribution at the location of the UE based on the information associated with the neighbor cell transmit beams.

The network controller 130 may include a neural processing engine 160. The neural processing engine 160 may predicting a spatial inter-cell interference-based distribution at the location of the UE based on the information associated with the neighbor cell transmit beams.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE), or via system information (e.g., a system information block (SIB)).

As indicated above, FIG. 1 is provided merely as an example. Other examples may differ from what is described with regard to FIG. 1.

Figure 2:
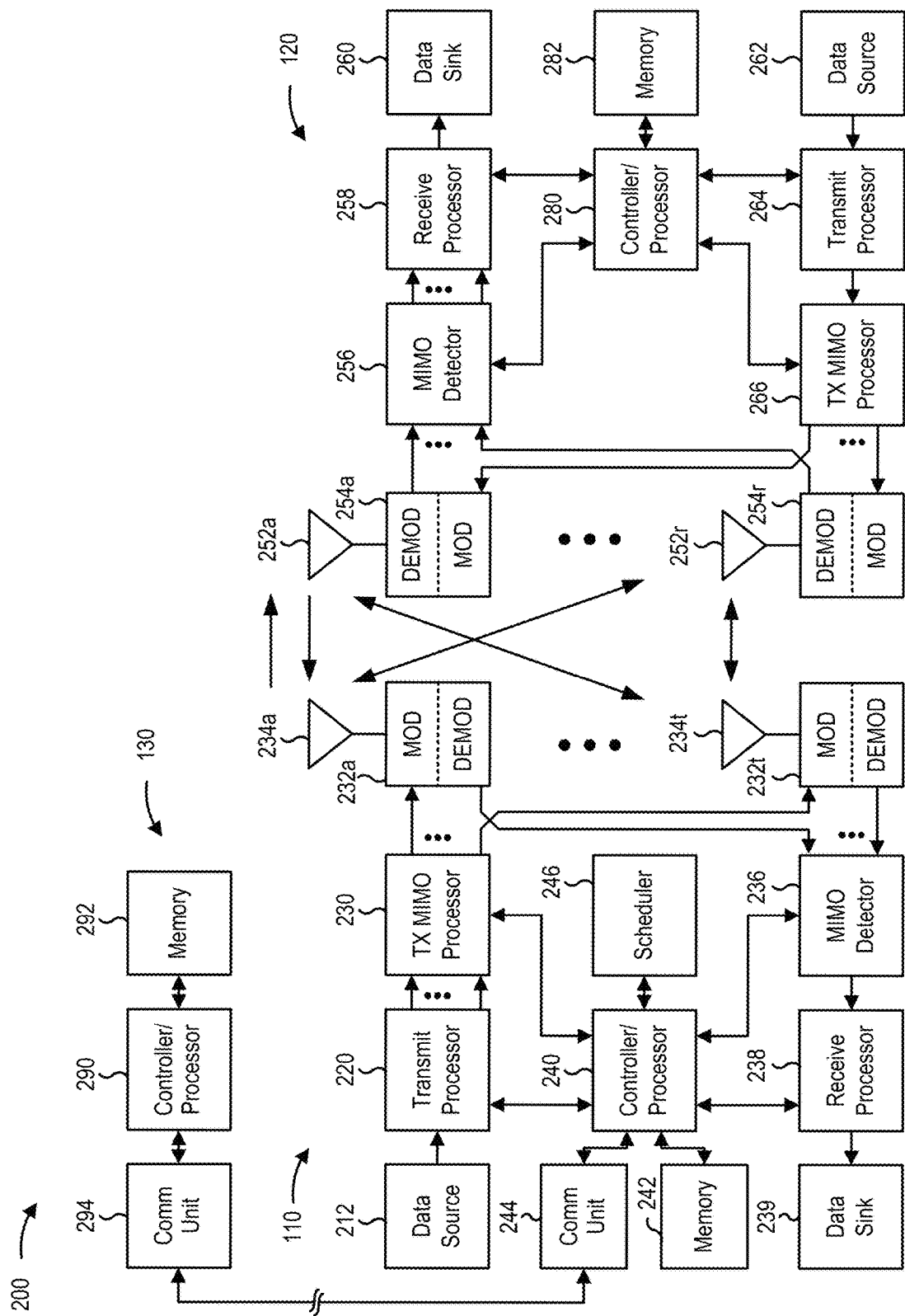
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine a reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 120, and/or the controller/processor 280 of the UE 120 of FIG. 2 may perform one or more techniques associated with machine learning for predicting location-based downlink interference assistance information for the UE 120, as described in more detail elsewhere. For example, the controller/processor 280 of the UE 120 of FIG. 2 may perform or direct operations of, for example, the processes of FIG. 8 and/or other processes as described. In addition, the controller/processor 240 of the base station 110 of FIG. 2 may perform or direct operations of, for example, the process of FIG. 9 and/or other processes as described. Memories 242 and 282 may store data and program codes for the base station 110 and UE 120, respectively. A scheduler 246 may schedule UEs for data transmission on the downlink and/or uplink.

In some aspects, base station 110, the UE 120 and the network controller 130 may include means for receiving, means for predicting, means for coordinating, and/or means for training. Such means may include one or more components of the UE 120, network controller 130, or the base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-everything (V2X) applications, and/or the like. Furthermore, in some cases, a single device may support different applications or services simultaneously.

Figure 3:
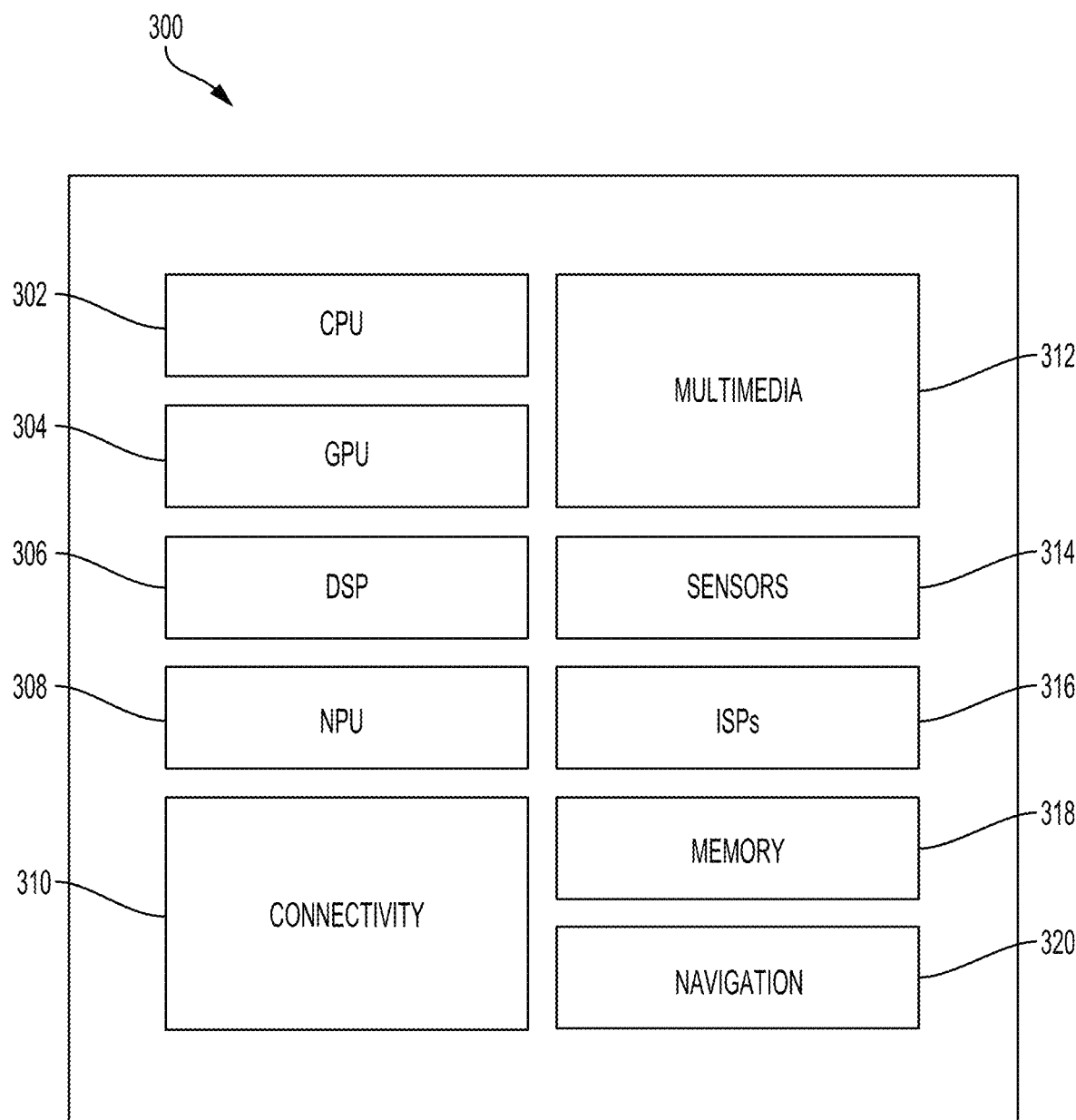
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise program code to receive a location of a user equipment (UE); program code to receive information associated with neighbor cell transmit beams; and program code to predict, by a network device, a spatial inter-cell interference-based distribution at the location of the UE based on the information associated with the neighbor cell transmit beams.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
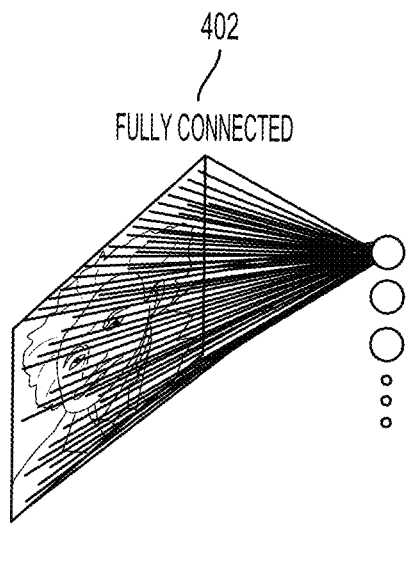
FIGS. 4A, 4B, and 4C are diagrams illustrating a neural network, in accordance with aspects of the present disclosure.
Figure 4B:
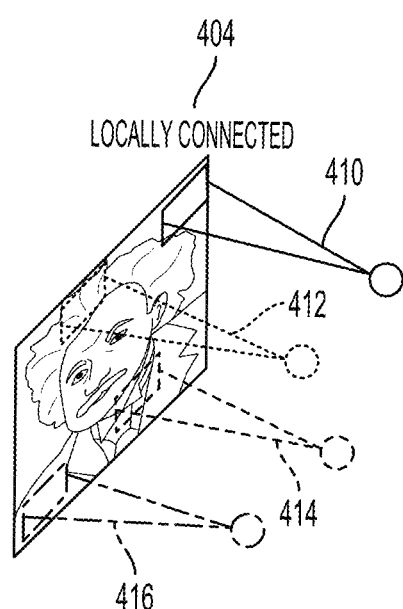

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
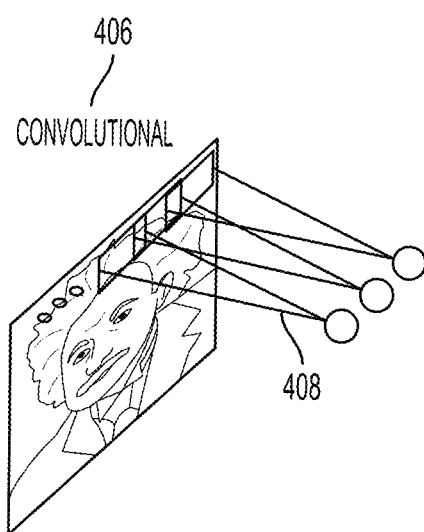

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
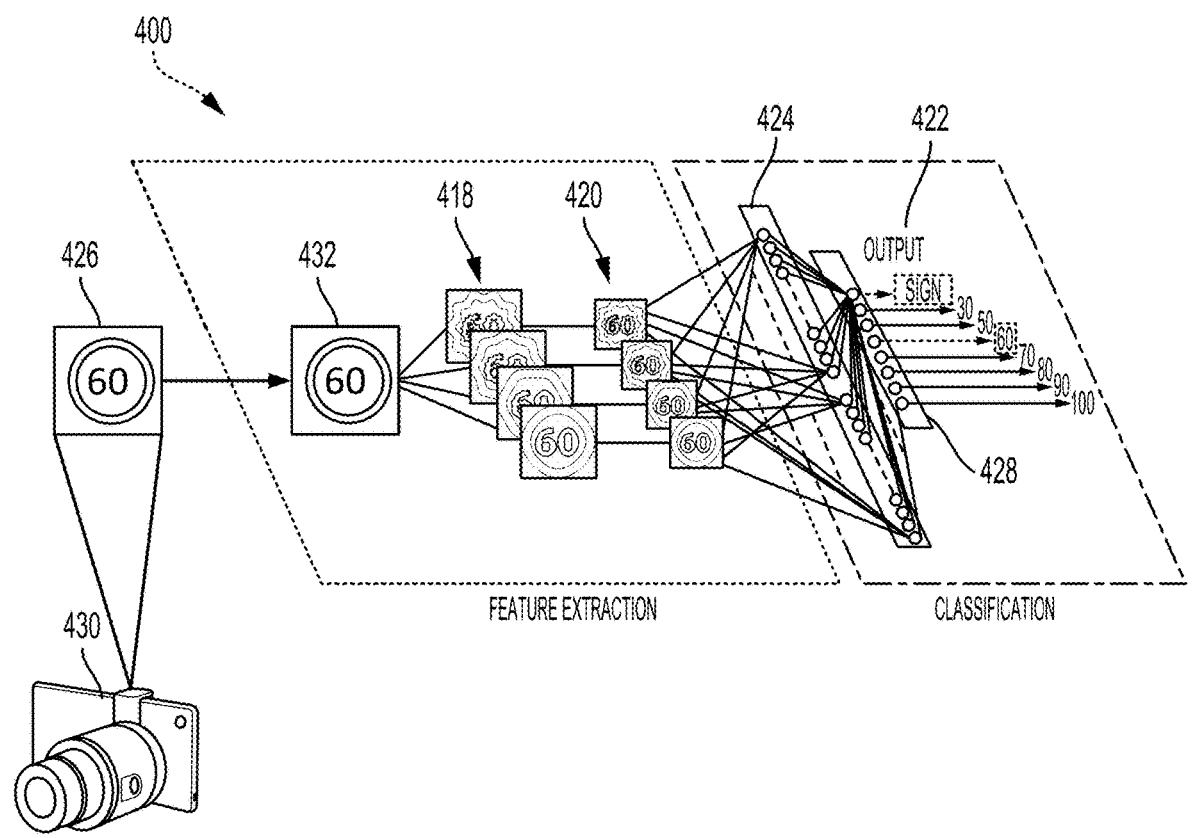
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
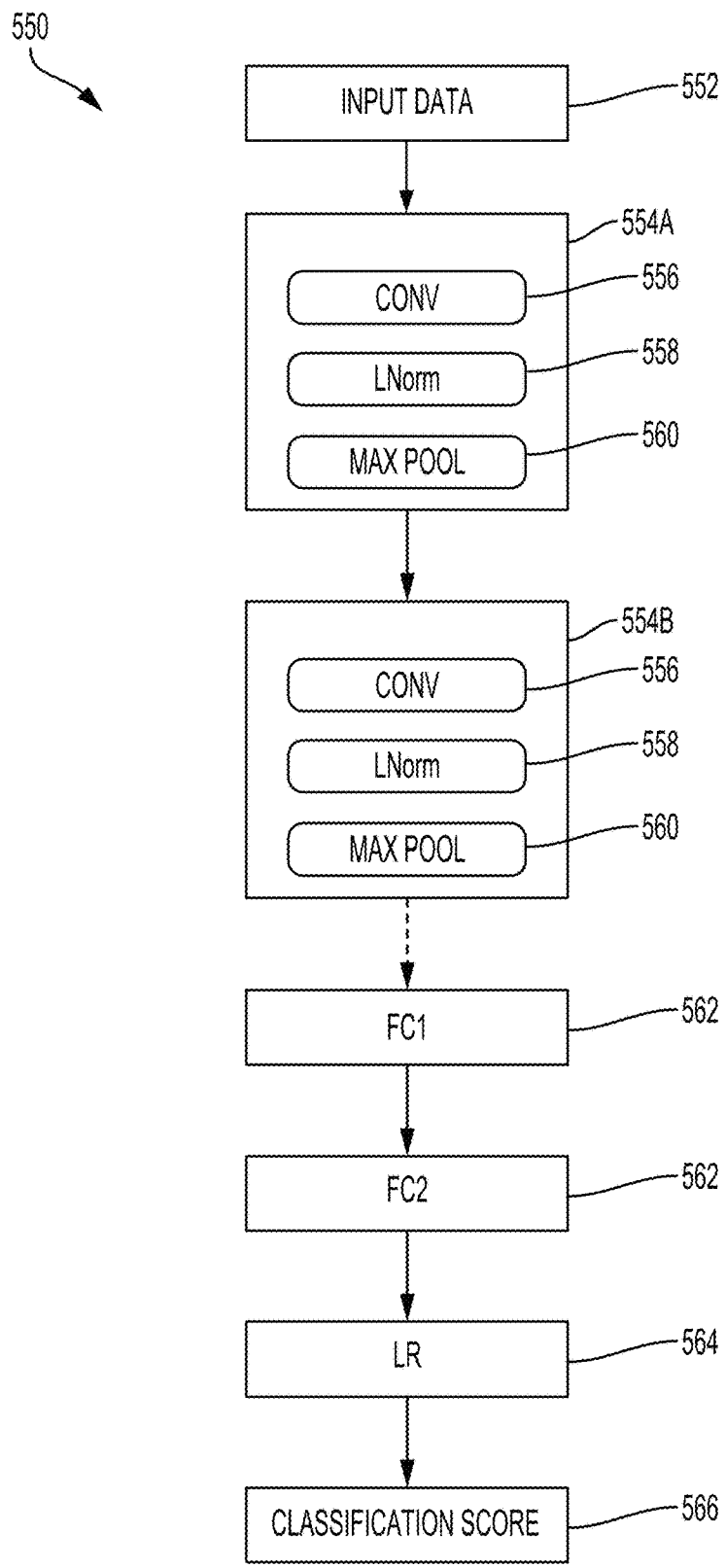
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As described above, inter-cell interference may result in signal (e.g., signal to interference plus noise ratio (SINR)) degradation for users. The signal degradation for users may be especially significant when a user is at a cell edge. In addition, due to introduction of massive multiple-input multiple-output (MIMO) antennas in next generation base stations (e.g., gNBs), this inter-cell interference may be highly directional and highly variant with time. Unfortunately, highly directional interference at the cell edge may reduce the data rate and negatively impact a user experience. Furthermore, high variance in the interference makes it more difficult to perform link adaptation, such as predicting a supportable modulation and coding scheme (MCS). This is challenging for latency sensitive applications, which have a limited delay budget. This limited delay budget may be insufficient to recover packets through hybrid automatic repeat request (HARM) procedures when a selected modulation and coding scheme (MCS) is inaccurate.

Figure 6A:
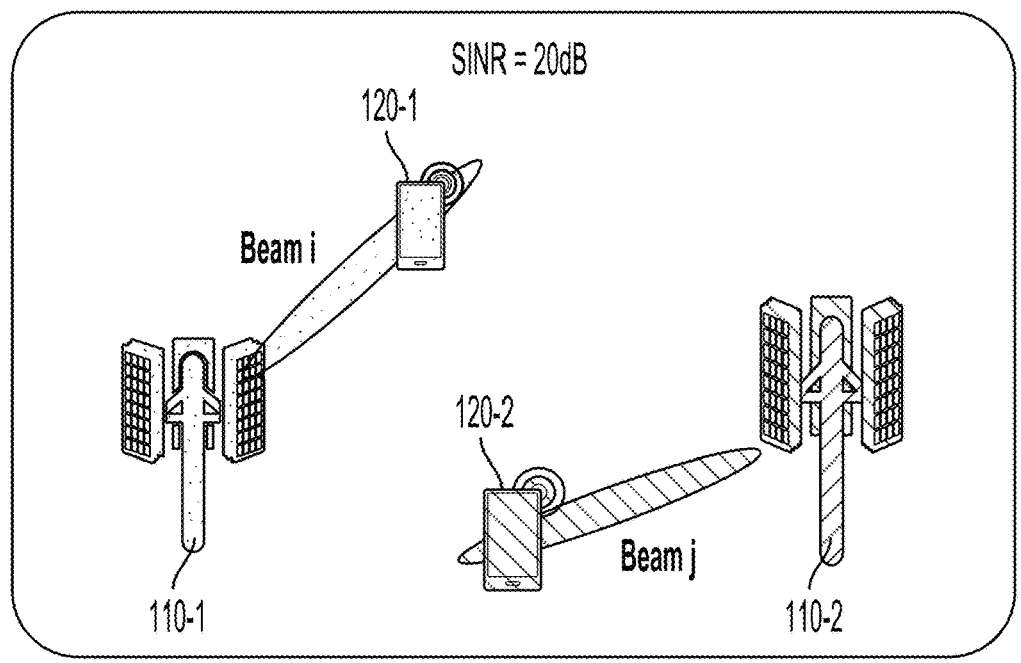
FIGS. 6A and 6B illustrate a communications network in which spatial interference experienced by a user equipment is based on a downlink transmit beam from a neighbor base station to a neighbor user equipment (UE), according to aspects of the present disclosure.
Figure 6B:
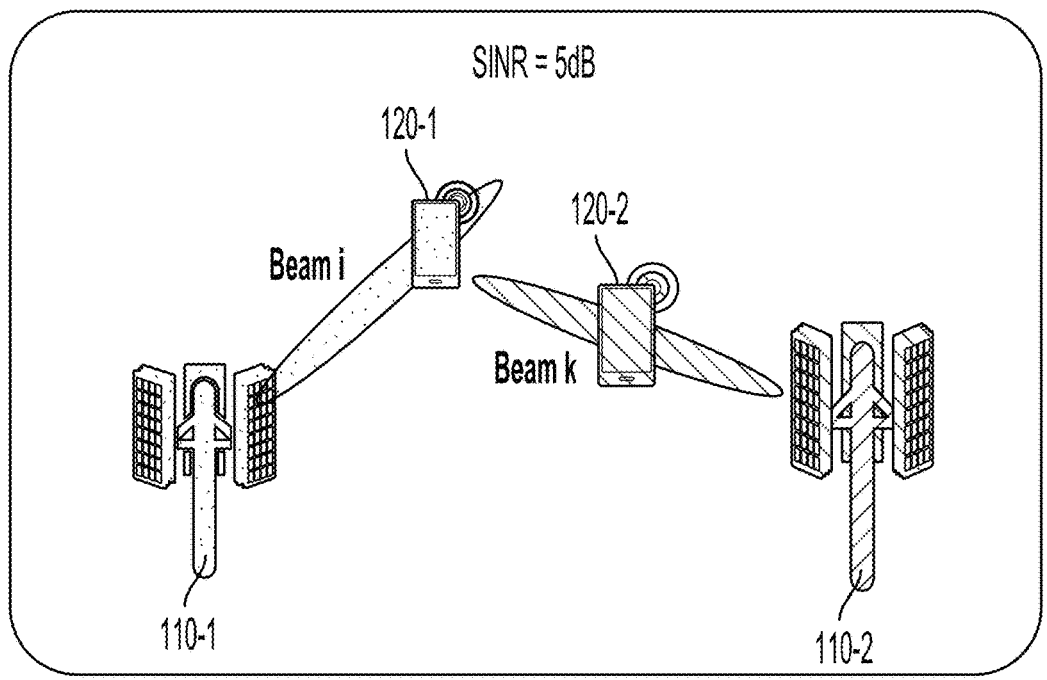

FIGS. 6A and 6B illustrate a communications network in which spatial interference experienced by a user equipment (UE) is based on a downlink transmit beam from a neighbor base station to a neighbor UE, according to aspects of the present disclosure. As shown FIG. 6A, a first interference scenario 600, in which a first UE 120-1 communicates with a first base station 110-1 through a downlink transmit beam i. Similarly, a second UE 120-2 communicates with a neighbor base station 110-2 through a downlink transmit beam j. In this example, spatial inter-cell interference from the downlink transmit beam j on the downlink transmit beam i results in minimal signal degradation at the first UE 120-1 (e.g., SINR=20 dB).

FIG. 6B illustrates a second interference scenario 650 in which the first UE 120-1 communicates with the first base station 110-1 through the downlink transmit beam i. By contrast, the second UE 120-2 communicates with the neighbor base station 110-2 through a downlink transmit beam k that interferes with the downlink transmit beam i. In this example, spatial inter-cell interference from the downlink transmit beam k on the downlink transmit beam i results in significant signal degradation at the first UE 120-1 (e.g., SINR=5 dB), which degrades the user experience at the first UE 120-1.

Figure 7:
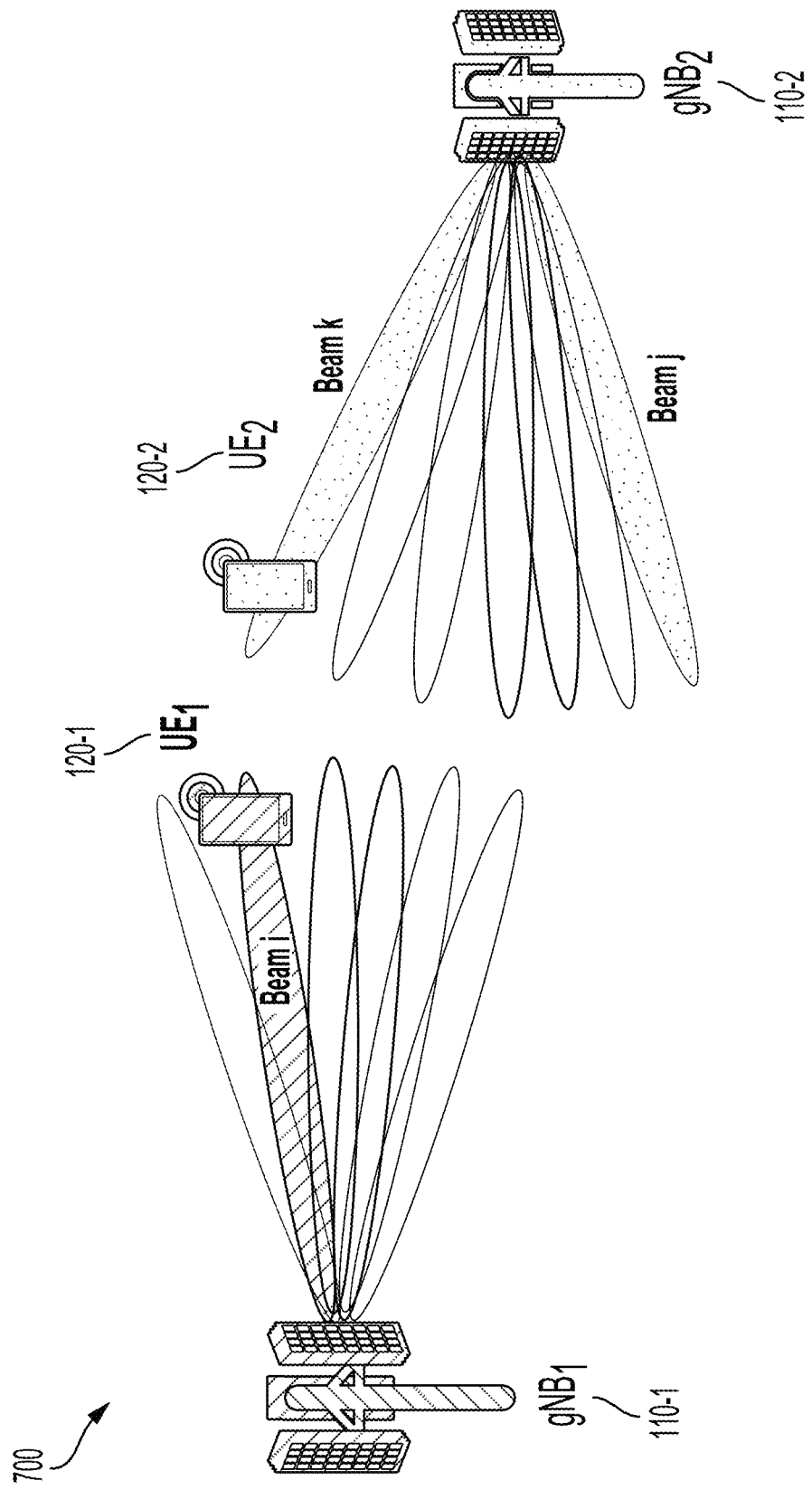
FIG. 7 is a diagram of a communications network illustrating signal strength measurement of downlink transmit beams from a neighbor base station to enable neural network-based spatial inter-cell interference learning, according to aspects of the present disclosure.

FIG. 7 is a diagram of a communications network 700 illustrating signal strength measurement of downlink transmit beams from a neighbor base station to enable neural network-based spatial inter-cell interference learning, according to aspects of the present disclosure. According to aspects of the present disclosure, a neural network is trained to infer the impact of any potential transmit beam of a neighbor base station (e.g., gNB) on any potential victim UE. In this example, a victim user equipment ($UE_1$) 120-1 communicates with a serving base station ($gNB_1$) 110-1 over a downlink transmit beam i. Unfortunately, the victim $UE_1$ 120-1 experiences significant interference from a downlink transmit beam k of a neighbor base station ($gNB_2$) used to communicate with a second user equipment ($UE_2$) 120-2.

In this example, spatial inter-cell interference on the victim $UE_1$ 120-1 is mitigated by coordination communication of the neighbor base station $gNB_2$ 110-2. For example, the neighbor base station $gNB_2$ 110-2 may transmit over the downlink beam j to avoid transmitting energy in the direction of the downlink transmit beam k over the resources used to serve the victim $UE_1$ 120-1. Aspects of the present disclosure coordinate with the neighbor base station $gNB_2$ to transmit over the downlink beam j with the resources used to serve the victim $UE_1$ 120-1 to avoid interference for the victim $UE_1$ 110-1.

According to aspects of the present disclosure, a neural network of the serving base station $gNB_1$ 110-1 is trained to infer the impact of downlink transmit beams of the neighbor base station $gNB_2$ 110-2 on the victim $UE_1$ 120-1. In these aspects of the present disclosure, the serving base station $gNB_1$ 110-1 coordinates with the neighbor base station $gNB_2$ 110-2 to prohibit communication of the downlink transmit beam k by the neighbor base station $gNB_2$ 110-2 over the time/frequency resources used to serve the victim $UE_1$ 120-1. In some configurations, the prediction of inter-cell interference is performed using machine learning with a neural processing engine (NPE), for example, as shown in FIG. 8.

Figure 8:
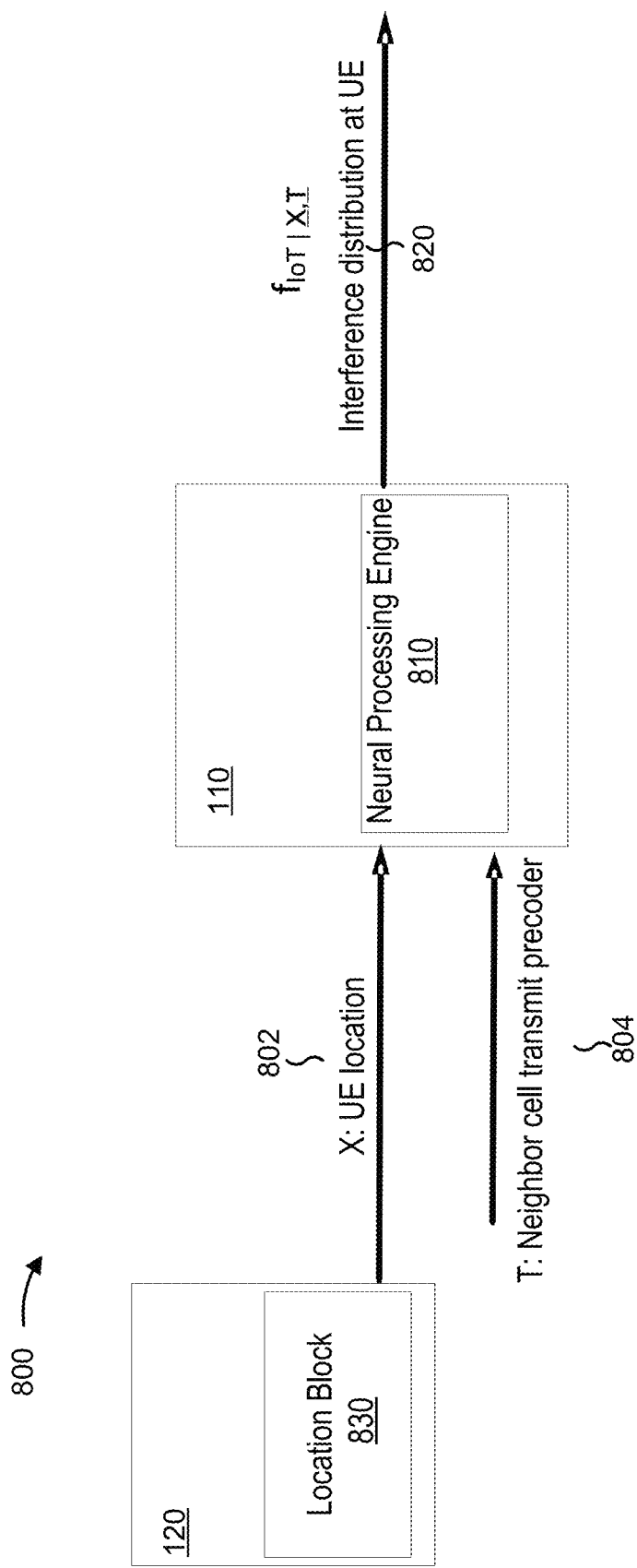
FIG. 8 is a block diagram of a network including a neural processing engine configured for neural network-based prediction of a spatial inter-cell interference-based distribution, according to aspects of the present disclosure.

FIG. 8 is a block diagram of a network including a neural processing engine configured for neural network-based prediction of a spatial inter-cell interference-based distribution, according to aspects of the present disclosure. FIG. 8 illustrates a network 800 including a UE 120 having a location block 830 and a base station 110 having a neural processing engine 810 to implement a neural network. In this example, the location block 830 indicates a UE location 802 (X) to the neural processing engine 810. A neighbor cell transmit precoder 804 (T) (e.g., a channel state information (CSI) beam index) is also input to the neural processing engine 810. Based on the UE location 802 and the neighbor cell precoder 804, the neural processing engine 810 predicts an interference-based distribution 820 (F) for the current location of the UE 120. For example, an interference (e.g., interference over thermal (IoT)) distribution may be predicted, or a signal to interference plus noise ratio (SINR) distribution may be predicted.

In aspects of the present disclosure, training of the neural network of the neural processing engine 810 may be based on UE channel state information (CSI) reference signal (CSI-RS) measurement reports, as well as the neighbor cell transmit precoder 804 and the UE location 802. The UE CSI-RS measurement report indicates a neighbor cell signal strength for each beam of a neighbor base station. For example, the signal strength measurement report may be based on a CSI report, including for example, SINR information or reference signal receive power (RSRP) information.

For training purposes, it may be assumed that the base stations 110 share their CSI-RS schedules, so when a UE measurement is performed, the base stations 110 may determine the beam to which the measurement corresponds. On the other hand, inference may be separately performed for the full set of beams. For example, assuming sixteen (16) precoders in a codebook, the neural network predicts an interference for each of the sixteen precoder. Once the interference is predicted, the predicted interference is used to identify the problematic precoders. Alternatively, a full set of precoders are provided to the neural network at one time. In response, the neural network performs inference for all of the precoders and subsequently classifies and identifies the problematic precoders.

In some aspects of the present disclosure, the base station 110 periodically sends precoded CSI-RS signals to the served UE 120. The served UE 120 may use the received CSI-RS signals to estimate the channel conditions. The served UE 120 may also use the received CSI-RS signals to identify a single beam or a combination of beams that results in the strongest received signal quality (e.g., a strongest beam) to help with data channel precoding. In addition, CSI-RS signals may be measured from other cells. For example, the UEs may estimate interference caused by the other cells using the CSI-RS signals from the other cells. The UEs may perform radio resource management using the measured CSI-RS signals. For example, the UEs use the measured CSI-RS signals of other cells to identify whether a neighbor cell is stronger than a current serving cell, which may trigger a handover. In practice, CSI-RS measurements performed by a UE are reported by the UE 120 to the serving cell 110.

As shown in FIG. 8, the neural network of the neural processing engine 810 is trained to predict an interference-based distribution 820 experienced at a given UE location 802 based on a neighbor cell transmit precoder 804 and the UE location 802. The neighbor cell transmit precoder 804 may be a precoder index within a known codebook or may be precoder weights. In aspects of the present disclosure, the UE location 802 may be represented in the form of a combination of: (x,y,z) coordinates of the UE 120 from a positioning source. The positioning source may be, for example, a global navigation satellite system (GNSS), 5G NR location server, etc.). Alternatively, the UE location 802 may be determined based on a set of metrics that represent the location of the UE 120 within a serving cell. For example, the set of metrics that represent the location of the UE 120 within a serving cell may include a serving cell reference signal received power (RSRP) signal, a serving cell precoder (e.g., precoding matrix (PMI)) indicating a strongest transmit beam direction, a serving cell channel quality indicator (CQI), and/or a path loss estimate for a channel between the serving cell and UE 120. In addition, the UE location 802 may be determined based on other UE sensor information. In some aspects, the UE location 802 may be a geolocation.

In aspects of the present disclosure, training of the neural network may be performed at various nodes. For example, training of the neural network may be performed at a serving cell. In this example, the interference measurement reports are sent to the base station 110 of the serving cell by the UE 120 along with information about the UE location 802. Positioning estimation of the UE 120 may be performed at the serving cell base station 110 or communicated to the base station 110 of the serving cell by a separate location server. Alternatively, UE location indicator metrics are reported by the UE 120 to the serving cell to determine the UE location 802.

In some aspects of the present disclosure, training of the neural network is performed at the neighbor cell(s), such as the neighbor base station 110-2, as shown in FIG. 7. In these aspects of the present disclosure, the base station 110-1 of the serving cell sends the UE location 802 and the interference measurement reports to the neighbor base station 110-2 to perform training of the neural network at the neighbor base station 110-2. In other aspects of the present disclosure, training of the neural network is performed at a centralized node. In these aspects of the present disclosure, the base station 110-1 of the serving cell sends the UE location 802, a serving cell identification (ID), a neighbor cell ID, and interference measurement reports to the centralized node to perform training of the neural network at the centralized node.

According to aspects of the present disclosure, neural network (NN) inference of an interference-based distribution 820 at a given UE location 802 may be performed at various nodes. For example, the neural network inference may be performed at the base station of the serving cell. In this example, the neural network of the base station 110-1 of the serving cell is used to predict the interference-based distribution 820 at the given UE location 802 due to a certain set of neighbor cell transmit beams. The neural network inference may be performed at the neighbor base station 110-2. For example, the neural network may either be trained at the neighbor base station 110-2, or the neural network weights may be shared with the neighbor base station 110-2. In this example, the neural network of the neighbor base station 110-2 is used to predict an interference-based distribution 820 at a given UE location 802 due to a certain set of downlink transmit beams, such as the beam k shown in FIG. 7. In some aspects of the present disclosure, the neural network inference is performed at a centralized node. In these aspects of the present disclosure, the neural network is either trained at the centralized node or the neural network weights are shared with the centralized node. For example, the neural network at the centralized node is used to predict the interference-based distribution 820 at a given UE location 802 due to a certain set of aggressor transmit beams.

According to aspects of the present disclosure, undesired neighbor cell beams are identified based on certain criteria according to the predicted interference-based distribution. For example, a mean or percentile exceeding a predetermined threshold may be the criteria. In addition, this spatial interference characterization may be used to coordinate scheduling between nearby cells, such as the neighbor base station 110-2 to prevent high interference events.

Figure 9:
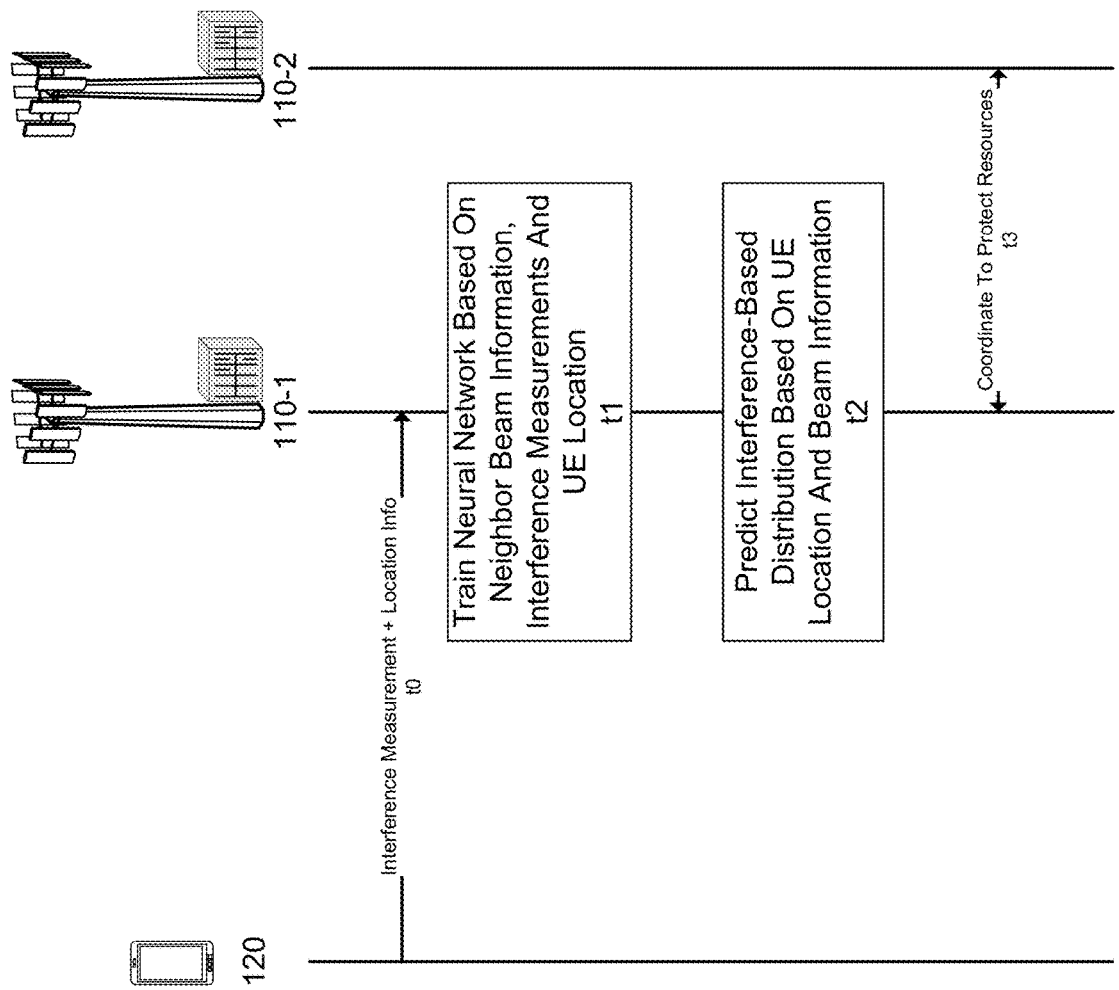
FIG. 9 is a timing diagram illustrating an example process performed, for example, by network of devices, for neural network-based spatial inter-cell interference-based learning, in accordance with various aspects of the present disclosure.

FIG. 9 is a timing diagram illustrating an example process performed, for example, by a UE 120, a first base station 110-1 and a second base station 110-2, for neural network-based spatial inter-cell interference-based learning, in accordance with various aspects of the present disclosure.

At time t0, the UE 120 transmits an interference measurement and location information to the first base station 110-1. In some implementations, the first base station 110-1 is a serving base station 110-1 of the UE 120. In addition, the second base station 110-2 is a neighbor base station 110-2 of the UE.

At time t1, a neural network is trained based on a neighbor beam information, interference measurements, and UE locations. In this implementation, the neural network is trained at the first base station 110-1. In other implementations, the neural network is trained at the second base station 110-2, which may be a neighbor cell base station. In some implementations, the neural network is trained at a central node (not shown).

At time t2, the neural network predicts an interference-based distribution based on the UE location and the beam information. In this implementation, the neural network prediction is performed at the first base station 110-1. That is, the neural network of the base station 110-1 of the serving cell is used to predict the interference-based distribution at the given UE location due to a set of neighbor cell transmit beams of the second base station 110-2 of the neighbor cell. In other implementations, the neural network prediction is performed at the second base station 110-2, which may be a neighbor cell base station. In some implementations, the neural network prediction is performed at a central node (not shown).

At time t3, the first base station 110-1 coordinates with the second base station 110-2 to protect resources allocated for communication with the UE 120 from spatial inter-cell downlink interference from the second base station 110-2. In this example, the neural network of the base station 110-1 of the serving cell is used to predict the interference-based distribution at the given UE location due to a neighbor cell transmit beams.

Figure 10:
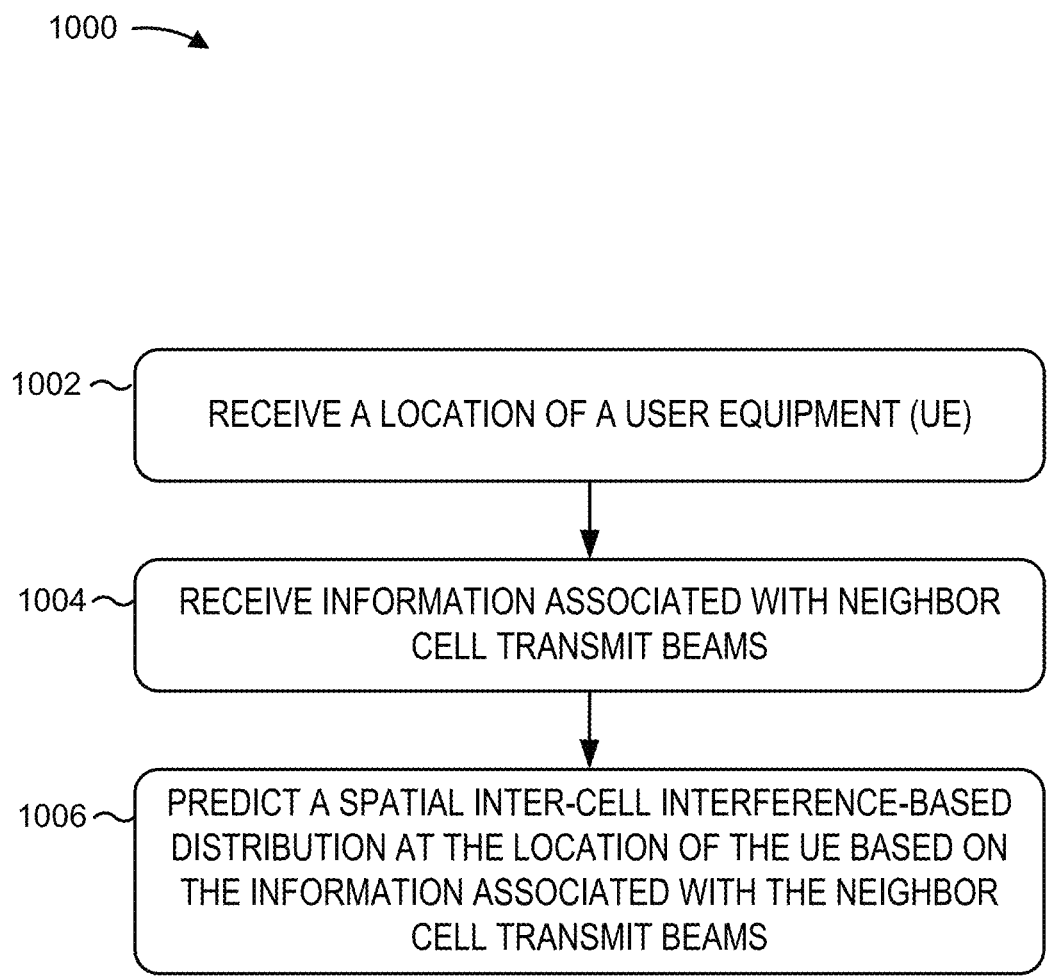
FIG. 10 is a flow diagram illustrating an example process performed, for example, by a network device, for neural network-based spatial inter-cell interference-based learning, in accordance with various aspects of the present disclosure.

FIG. 10 is a flow diagram illustrating an example process 1000 of a method of wireless communication performed, for example, by a network device, for neural network-based spatial inter-cell interference-based learning, in accordance with various aspects of the present disclosure. The example process 1000 is an example of a 5G new radio (NR) base station enhancement for neural network-based spatial inter-cell interference-based learning.

As shown in FIG. 10, in some aspects, the process 1000 includes receiving a location of a user equipment (UE) (block 1002). For example, the base station (e.g., using the controller/processor 240, and/or the memory 242) can receive the location of the UEs. In some aspects, the process 1000 further includes receiving information associated with neighbor cell transmit beams (block 1004). For example, the base station (e.g., using the antenna 234, the DEMOD/MOD 232, the MIMO detector 236, the receive processor 238, the controller/processor 240, and/or the memory 242) can receive the information associated with neighbor cell transmit beams. In some aspects, the process 1000 further includes predicting a spatial inter-cell interference-based distribution at the location of the UE based on the information associated with the neighbor cell transmit beams (block 906). For example, the base station (e.g., using the controller/processor 240, and/or the memory 242) can predict the spatial inter-cell interference-based distribution at the location of the UE.

Implementation examples are described in the following numbered clauses:

1. A method of wireless communication by a network device, comprising:
   receiving a location of a user equipment (UE);
   receiving information associated with neighbor cell transmit beams; and
   predicting a spatial inter-cell interference-based distribution at the location of the UE based on the information associated with the neighbor cell transmit beams.

2. The method of clause 1, further comprising coordinating with the at least one neighbor cell to schedule downlink transmit beams in time and frequency resources different than time and frequency resources serving the UE.

3. The method of any of clauses 1-2, further comprising training a neural network to learn the spatial inter-cell interference-based distribution for a plurality of locations.

4. The method of any of clauses 1-3, in which the network device comprises a serving cell and learning the spatial inter-cell interference-based distribution is based on receiving channel state information (CSI) reference signal (CSI-RS) measurement reports from UEs at the plurality of locations.

5. The method of any of clauses 1-3, in which the network device comprises a neighbor cell or a centralized node to learn the spatial inter-cell interference-based distribution is based on information received from a serving cell.

6. The method of any of clauses 1-3, in which the network device comprises a serving cell and the method further comprises training the neural network at the serving cell to compute neural network weights.

7. The method of any of clauses 1-3 and 6, further comprising sharing the neural network weights with a neighbor cell.

8. The method of any of clauses 1-3 and 6, further comprising sharing the neural network weights with a centralized node.

9. The method of clauses 1-3 and 6, in which the network device is a serving cell.

10. The method of clause 1, in which the network device is a neighbor cell.

11. The method of clause 1, in which the network device is a centralized node.

12. The method of any of clauses 1-11, in which receiving the location comprises determining the location based on a serving cell reference signal received power (RSRP), a strongest beam from a serving cell, a serving cell precoder, a serving cell channel quality indicator (CQI), and/or a path loss estimate between the serving cell and the UE.

13. The method of any of clauses 1-11, in which receiving the location of the UE comprises receiving a geolocation of the UE.

14. The method of any of clauses 1-13, in which the information associated with the neighbor cell transmit beams comprises a precoder index with a known codebook and/or precoder weights.

15. The method of any of clauses 1-14, further comprising identifying undesired neighbor cell downlink transmit beams according to criteria of the interference-based distribution exceeding a predetermined threshold.

16. The method of any of clauses 1-15, in which the interference-based distribution comprises a signal to interference plus noise (SINR) distribution.

17. The method of any of clauses 1-15, in which the interference-based distribution comprises an interference over thermal (IoT) distribution.

18. An apparatus for wireless communication by a network device, comprising:
   means for receiving a location of a user equipment (UE);
   means for receiving information associated with neighbor cell transmit beams; and
   means for predicting a spatial inter-cell interference-based distribution at the location of the UE based on the information associated with the neighbor cell transmit beams.

19. The apparatus of clause 18, further comprising means for coordinating with the at least one neighbor cell to schedule downlink transmit beams in time and frequency resources different than time and frequency resources serving the UE.

20. The apparatus of any of clauses 18-19, further comprising means for training a neural network to learn the spatial inter-cell interference-based distribution for a plurality of locations.

21. The apparatus of any of clauses 18-20, in which the network device comprises a serving cell to learn the spatial inter-cell interference-based distribution is based on receiving channel state information (CSI) reference signal (CSI-RS) measurement reports from UEs at the plurality of locations.

22. A network device, comprising:
   a processor;
   a memory coupled with the processor;
   instructions stored in the memory and operable, when executed by the processor, to cause the network device:
      to receive a location of a user equipment (UE),
      to receive information associated with neighbor cell transmit beams, and
      to predict a spatial inter-cell interference-based distribution at the location of the UE based on the information associated with the neighbor cell transmit beams.

23. The network device of clause 22, in which the instructions further cause the network device to train a neural network to learn the spatial inter-cell interference-based distribution for a plurality of locations.

24. The network device of any of clauses 22-23, in which the network device comprises a serving cell and learning the spatial inter-cell interference-based distribution is based on receiving channel state information (CSI) reference signal (CSI-RS) measurement reports from UEs at the plurality of locations.

25. The network device of any of clauses 22-23, in which the network device comprises a neighbor cell or a centralized node and learning the spatial inter-cell interference-based distribution is based on information received from a serving cell.

26. The network device of any of clauses 22-23, in which the network device comprises a serving cell and the instructions further the serving cell to train the neural network at the serving cell to compute neural network weights.

27. The network device of any of clauses 22-23, in which the network device comprises a serving cell, a neighbor cell, and/or a centralized node.

28. A non-transitory computer-readable medium having program code recorded thereon, the program code executed by a processor and comprising:
   program code to receive a location of a user equipment (UE);
   program code to receive information associated with neighbor cell transmit beams; and
   program code to predict, by a network device, a spatial inter-cell interference-based distribution at the location of the UE based on the information associated with the neighbor cell transmit beams.

29. The non-transitory computer-readable medium of clause 28, further comprising program code to train a neural network to learn the spatial inter-cell interference-based distribution for a plurality of locations.

30. The non-transitory computer-readable medium of any of clauses 28-29, in which the network device comprises a serving cell to learn the spatial inter-cell interference-based distribution is based on program code to receive channel state information (CSI) reference signal (CSI-RS) measurement reports from UEs at the plurality of locations.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a network device, comprising:
   receiving a location of a user equipment (UE);
   receiving information associated with neighbor cell transmit beams; and
   predicting a spatial inter-cell interference-based distribution at the location of the UE based on the information associated with the neighbor cell transmit beams.

2. The method of claim 1, further comprising coordinating with the at least one neighbor cell to schedule downlink transmit beams in time and frequency resources different than time and frequency resources serving the UE.

3. The method of claim 1, further comprising training a neural network to learn the spatial inter-cell interference-based distribution for a plurality of locations.

4. The method of claim 3, in which the network device comprises a serving cell and learning the spatial inter-cell interference-based distribution is based on receiving channel state information (CSI) reference signal (CSI-RS) measurement reports from UEs at the plurality of locations.

5. The method of claim 3, in which the network device comprises a neighbor cell or a centralized node to learn the spatial inter-cell interference-based distribution is based on information received from a serving cell.

6. The method of claim 3, in which the network device comprises a serving cell and the method further comprises training the neural network at the serving cell to compute neural network weights.

7. The method of claim 6, further comprising sharing the neural network weights with a neighbor cell.

8. The method of claim 6, further comprising sharing the neural network weights with a centralized node.

9. The method of claim 1, in which the network device is a serving cell.

10. The method of claim 1, in which the network device is a neighbor cell.

11. The method of claim 1, in which the network device is a centralized node.

12. The method of claim 1, in which receiving the location comprises determining the location based on a serving cell reference signal received power (RSRP), a strongest beam from a serving cell, a serving cell precoder, a serving cell channel quality indicator (CQI), and/or a path loss estimate between the serving cell and the UE.

13. The method of claim 1, in which receiving the location of the UE comprises receiving a geolocation of the UE.

14. The method of claim 1, in which the information associated with the neighbor cell transmit beams comprises a precoder index with a known codebook and/or precoder weights.

15. The method of claim 1, further comprising identifying undesired neighbor cell downlink transmit beams according to criteria of the interference-based distribution exceeding a predetermined threshold.

16. The method of claim 1, in which the interference-based distribution comprises a signal to interference plus noise (SINR) distribution.

17. The method of claim 1, in which the interference-based distribution comprises an interference over thermal (IoT) distribution.

18. An apparatus for wireless communication by a network device, comprising:
means for receiving a location of a user equipment (UE);
means for receiving information associated with neighbor cell transmit beams; and
means for predicting a spatial inter-cell interference-based distribution at the location of the UE based on the information associated with the neighbor cell transmit beams.

19. The apparatus of claim 18, further comprising means for coordinating with the at least one neighbor cell to schedule downlink transmit beams in time and frequency resources different than time and frequency resources serving the UE.

20. The apparatus of claim 18, further comprising means for training a neural network to learn the spatial inter-cell interference-based distribution for a plurality of locations.

21. The apparatus of claim 20, in which the network device comprises a serving cell to learn the spatial inter-cell interference-based distribution is based on receiving channel state information (CSI) reference signal (CSI-RS) measurement reports from UEs at the plurality of locations.

22. A network device, comprising:
a processor;
a memory coupled with the processor;
instructions stored in the memory and operable, when executed by the processor, to cause the network device:
to receive a location of a user equipment (UE),
to receive information associated with neighbor cell transmit beams, and
to predict a spatial inter-cell interference-based distribution at the location of the UE based on the information associated with the neighbor cell transmit beams.

23. The network device of claim 22, in which the instructions further cause the network device to train a neural network to learn the spatial inter-cell interference-based distribution for a plurality of locations.

24. The network device of claim 23, in which the network device comprises a serving cell and learning the spatial inter-cell interference-based distribution is based on receiving channel state information (CSI) reference signal (CSI-RS) measurement reports from UEs at the plurality of locations.

25. The network device of claim 23, in which the network device comprises a neighbor cell or a centralized node and learning the spatial inter-cell interference-based distribution is based on information received from a serving cell.

26. The network device of claim 23, in which the network device comprises a serving cell and the instructions further the serving cell to train the neural network at the serving cell to compute neural network weights.

27. The network device of claim 22, in which the network device comprises a serving cell, a neighbor cell, and/or a centralized node.

28. A non-transitory computer-readable medium having program code recorded thereon, the program code executed by a processor and comprising:
program code to receive a location of a user equipment (UE);
program code to receive information associated with neighbor cell transmit beams; and
program code to predict, by a network device, a spatial inter-cell interference-based distribution at the location of the UE based on the information associated with the neighbor cell transmit beams.

29. The non-transitory computer-readable medium of claim 28, further comprising program code to train a neural network to learn the spatial inter-cell interference-based distribution for a plurality of locations.

30. The non-transitory computer-readable medium of claim 29, in which the network device comprises a serving cell to learn the spatial inter-cell interference-based distribution is based on program code to receive channel state information (CSI) reference signal (CSI-RS) measurement reports from UEs at the plurality of locations.

* * * * *